Dec. 10, 1968   F. KRAISSL, JR   3,415,041
OIL SEPARATORS
Original Filed Feb. 28, 1964   2 Sheets-Sheet 1
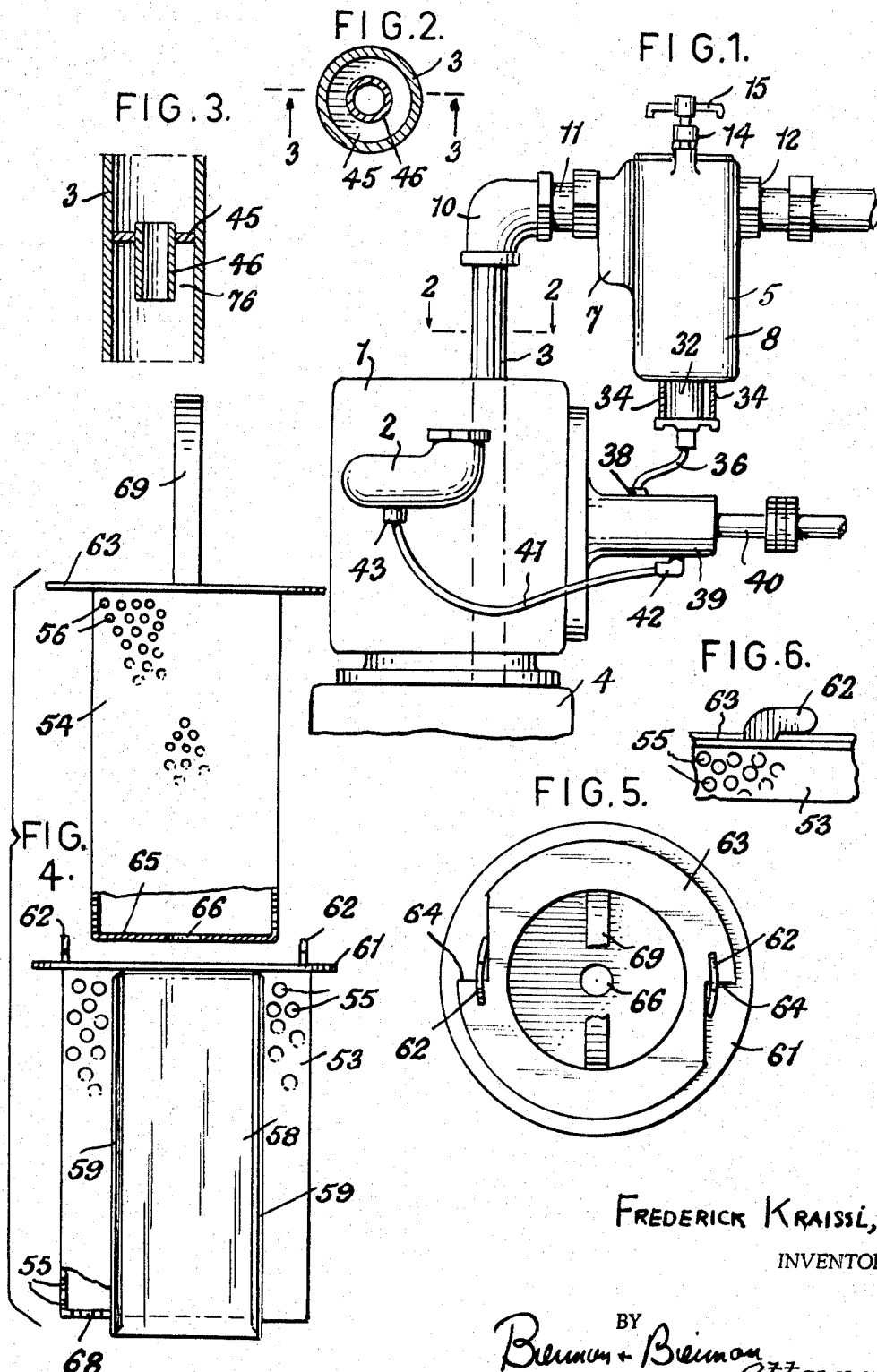
FREDERICK KRAISSL, JR.
INVENTOR.
BY Brennan + Brennan
Attorneys.

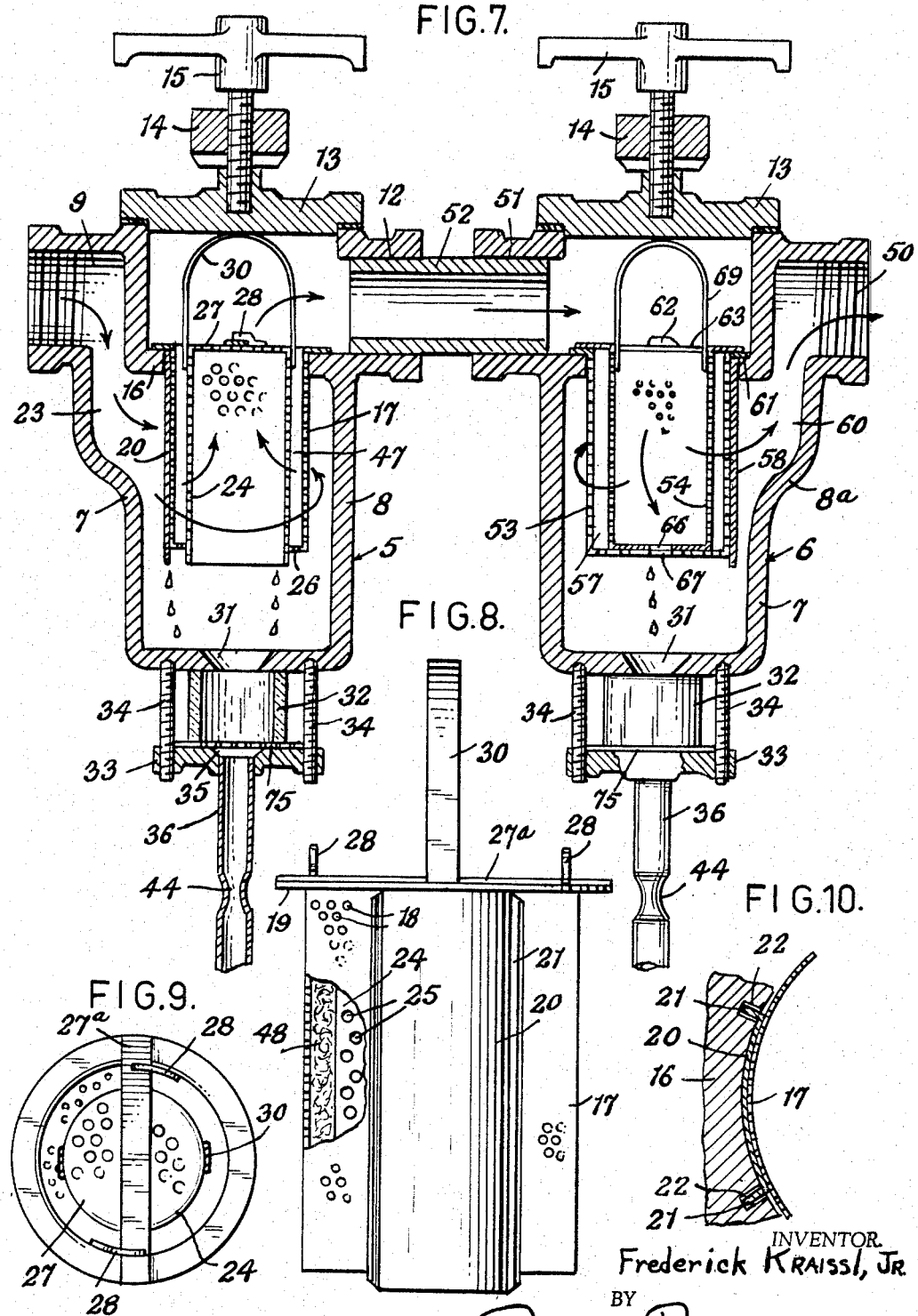

United States Patent Office 3,415,041
Patented Dec. 10, 1968

3,415,041
OIL SEPARATORS
Frederick Kraissl, Jr., 244 Kinderkamack Road, North Hackensack, N.J. 07661
Continuation of application Ser. No. 348,116, Feb. 28, 1964. This application Aug. 18, 1967, Ser. No. 661,725
4 Claims. (Cl. 55—342)

ABSTRACT OF THE DISCLOSURE

An oil and gas separator provided with spaced foraminous sleeves and deflecting baffle interposed between the inlet and outlet.

---

This is a continuation of application Ser. No. 348,116, filed Feb. 28, 1964, now abandoned.

This invention relates to lubricating and oil recovery means for air pumps and has for one of its objects the provision of an apparatus which will recover part of the oil that is usually wasted with the type of air pump that is supplied with force-feed lubrication.

There are two general systems employed for the lubrication of air pumps. The term "air pump" as herein used, is intended to refer to compressors and vacuum pumps. One of the systems makes use of drip cup lubrication and the other system which is in general use with automotive displacement mechanisms, uses the continuous supply of lubricant under pressure and is generally referred to as force-feed lubrication. Such form of lubrication operates by an over-supply of the lubricant to insure the adequate lubrication of all of the required parts, with a return of the excess lubricant to the reservoir supply. The present invention has reference to means employed in connection with the latter form of lubrication.

I have found that with rotary air pumps for both positive and negative pressure service, it is possible to permit the oil reservoir to be a part of the pressure system and to utilize the differential pressure to force the flow of oil to the required points through directed channels and properly sized orifices, permitting the excess oil in liquid, entrained or pumped and thence separated and recovered by the devices forming the subject of this invention.

More particularly, the invention contemplates the provision of an oil separator housing connected to a stand pipe leading from the outlet of the pump, said housing containing separation means in the form of a plurality of concentric, spaced-apart foraminous sleeves, with the perforations in one of the sleeves being of larger diameter than those in the other sleeve, and with baffle or deflector means in the housing arranged to deflect the air through the perforations in the sleeves and thus separate the oil from the air flow. The oil thus separated, drains down and out of the housing through a tube or pipe having a restricted orifice and which pipe communicates with the air inlet of the pump or with the oil sump thereof.

With these and other objects to be hereinafter set forth in view, I have devised the arrangement of parts to be described and more particularly pointed out in the claims appended hereto.

In the accompanying drawings, wherein an illustrative embodiment of the invention is disclosed, FIG. 1 is a view showing parts of an air pump, with the improved oil separator applied thereto;

FIG. 2 is a sectional view through the standpipe, the view being taken substantially on the line 2—2 of FIG. 1, looking in the direction of the arrows;

FIG. 3 is a vertical sectional view, taken on the line 3—3 of FIG. 2, looking in the direction of the arrows;

FIG. 4 is an exploded view, with parts shown in section, of one of the baskets or separators;

FIG. 5 is a top plan view, with parts fragmentarily shown, of the separator of FIG. 4;

FIG. 6 is a detail view showing one of the locking lugs on the foraminous separator;

FIG. 7 is a vertical sectional view through two of the separator units in connected relationship;

FIG. 8 is an elevational view of another type of separator and such as is employed in one of the units shown in FIG. 7;

FIG. 9 is a top plan view in a reduced scale, of the separator shown in FIG. 9, and FIG. 10 is a sectional view, showing how the flanges on a baffle plate on each separator engage with slots in the separator housing to thereby maintain the baffle plate positioned in the required manner.

Referring to the drawings, 1 indicates generally an air pump of known construction. The air pump is provided with an air inlet pipe 2 and an air discharge pipe 3, the latter pipe being shown as a vertical standpipe. The discharge pipe 3 conducts air and air trained oil from the oil reservoir 4 after mechanically entrained oil has been returned to the reservoir.

In FIG. 7 is shown two separate units, designated respectively at 5 and 6. One or the other of these separator units may be used or two or more of them can be used in series in conjunction with the pump. One of the units connected to the pump is shown in FIG. 1 and two of the units coupled together, are shown in FIG. 7. In the showing of FIG. 7, the air flow passes first through the unit 5 and then through and out of the unit 6. A unit such as shown at 5 will first be described.

A unit such as shown at 5, includes a housing 8, having a barrel portion 7 in communication with an internally threaded inlet port 9 which, as shown in FIG. 1, is connected to the upper end of the standpipe 3 by means of the elbow 10 and the nipple 11. In horizontal alignment with the inlet port 9 is the air discharge port 12 leading to the source of use for the discharged air, or as shown in FIG. 7, to the second oil separator 6.

The housing 7 is closed at the top by a closure plate or cover 13 that is maintained in its closed position by means of a clamp 14 held down by the hand screw 15.

Located in the housing 7 is a ledge 16 acting as a seat for the perforated separator or basket shown, for example, in FIGS. 9 and 10. Such separator consists of an outer foraminous sleeve 17, provided all over with small holes or perforations, shown at 18. The outer sleeve 17 is provided at the top with a radially-extending annular flange 19 which rests on the ledge 16 as shown in FIG. 7 and supports the separator within the barrel 8 of the housing. Mounted on the outside of the sleeve 17 and conforming in shape to a portion of the outer surface thereof and arranged contiguously to such surface, is an arcuate baffle plate 20 provided along its opposite longitudinal edges with projecting flanges 21. As shown in FIG. 10, these flanges 21 are arranged to enter slots 22 provided in the ledge 16 to thereby retain the separator basket in such position that it is interposed in the path of the inlet channel 23 which channel establishes communication between the inlet port 9 and the interior of the barrel 8. This arrangement is such that air and the oil entrained therewith and entering the housing is deflected by the baffle plate 20 and is caused to flow around the outside of the sleeve 17 and through the perforations 18 therein to then flow up through the inner sleeve and out of the perforated top thereof as shown by the arrows in the unit 5 of FIG. 7.

Disposed concentrically within the outer sleeve 17 and spaced therefrom is an inner sleeve shown at 24, said sleeve 24 being of smaller diameter than the outer sleeve 17 so that an annular space exists between the two sleeves, Said inner sleeve is of foraminous nature and thus is provided with the all-over holes shown at 25. It is to be noted that the holes 25 in the inner sleeve are of larger diameter than those shown at 18 in the outer sleeve, whereby the air flow and the air-entrained oil first encounters the smaller holes 18 and then contacts the larger holes 25.

The lower end of the inner sleeve 24 extends through an opening in the perforated bottom wall 26 of the outer sleeve 17 and the inner sleeve is provided with a perforated top wall shown at 27. Extending across and attached to the top wall 27 is a cross-bar or strip 27a, the end portions of which overlie the flange 19 on the outer sleeve, said end portions projecting under hook-shaped lugs 28 (FIG. 6) secured to and projecting upwardly from the outer sleeve 17. This arrangement is such that by rotatively moving the inner sleeve relatively to the outer sleeve, the cross-bar 27a may be either engaged under the lugs 28 or else disengaged therefrom as required. Thus, the two sleeves can be readily separated for cleaning or for any other purposes.

Upstanding from the top of the inner sleeve 24 is a loop-shaped strip 30 which forms a handle by which the separator can be handled and readily seated within the barrel 7 or removed therefrom. The cover plate 13, as contacting with the top of the loop 30 serves to retain the separator or basket in its properly-seated position within the barrel and resting against the ledge 16.

The bottom wall of the barrel 7 of the housing is formed with a frusto-conical drain outlet 31 which leads into an inspection tube 32. Said inspection tube is located below the outlet 31 and is preferably composed of transparent material such as a Pyrex type gauge glass, or it can be composed of a suitable plastic material, and it permits the oil to be seen through it. The inspection tube 32 is closed at its lower end by a closure plate 33 held in place by the screws 34. A fine mesh filter or screen 75 is interposed between the bottom of the inspection tube and the top of the closure plate 33. The closure plate 33 is provided with an outlet opening 35 also of frusto-conical form. A drain tube or pipe 36 is connected at one end to the closure plate 33 and it communicates with the outlet opening 35 and said tube 36 is connected at its opposite end as shown at 38 (FIG. 1) to a lantern gland stuffing box 39 for the drive shaft 40 of the pump. Another tube or pipe shown at 41 has one end connected at 42 to the stuffing box 39 and has its other end connected at 43 to the air inlet port 2. The tube or pipe 36 may have its internal passage or orifice contracted, as shown at 44, at any desired point between the sight glass 32 and the suction port 2. The constriction of the tube 36 prevents air from being suctionally moved too fast by the action of the pump so that suction is therefore not lost.

Located within the standpipe 3, at a suitable point therein, is an annular baffle 45 (FIGS. 2 and 3) the same extending around a short tube 46, an annular spacing 76 being thus defined between the outside of the tube 46 and the inner wall surface of the standpipe. It will also be noted that there is an annular spacing 47 between the inner sleeve 24 of the separator basket and its outer sleeve 17 and this spacing may, if it is found necessary or desirable, be packed with metallic wool as shown at 48 in FIG. 8.

When one of the separating units is employed, as shown in FIG. 1, the oil-laden air enters into the separator housing from the standpipe 3 and passing therethrough impinges against the annular baffle 45 therein, such impingement tending to separate some of the oil from the air, the latter passing through the central or inner sleeve 46 while the separated oil drains down through the pipe 3 and coats the inside wall surface of the standpipe with such oil.

The oil-laden air next enters through the inlet port 9 and passes down through the passage 23 to impinge against the baffle plate 20 disposed in the path of flow of the air as seen at the left in FIG. 7. The air then circulates around the concentric, foraminous tubes 17 and 25 which constitutes separation elements and which act as collecting agents for the oil which then drips down in the barrel 7 and into the sight tube 32 to pass through the screen 75 and out through the opening 35 and through the tube or pipe 36 to the stuffing box 39 from which it is returned to the inlet port 2 for re-circulation. The lantern gland of the stuffing box 39 is provided with packings which are located both inside and outside of the stuffing box. This permits the oil returning from the separator unit to lubricate the packings and by reducing the pressure on the lantern gland to the intake pressure or suction created by the pump, oil is prevented or retarded from leaking past the outer packing in the gland, as this makes for an almost leakless pump, since the oil flowing through the lantern gland past the outer packing returns through the oil-return line 41 to the suction port of the pump.

As was heretofore stated, FIG. 1 shows the installation of one of the oil separating units, such as that shown at 5 in FIG. 7. In FIG. 7 two separator units are coupled together in series. The housings 8 and 8a respectively of the units are similar but are located in reversed positions. That is to say, the inlet port 9 of the housing 8 serves as the outlet port 50 of the housing 8a. The outlet port 12 of the housing 8 is coupled to the inlet port 51 of the housing 8a by means of the nipple 52. The parts of the housing 8a are otherwise similar to like parts of the housing 8 and are herein similarly designated.

The oil separation unit contained in the housing 8a is shown in FIGS. 4 and 5 and the same is primarily composed of two concentrically positioned foraminous sleeves designated respectively at 53 and 54. In this separator or basket, the holes 55 provided all over in the outer sleeve 53, are of larger diameter than the holes 56 formed in the inner sleeve 54. The inner sleeve 54 is of smaller diameter than the outer sleeve 53 thus resulting in an annular spacing 57 between the two sleeves substantially as shown in FIG. 7.

Provided on the outside surface of the outer sleeve 53 is an arcuate baffle plate 58, substantially similar to the plate shown at 20 on the sleeve 17, said baffle plate covering a portion only of the outer sleeve 53 and being provided along its opposite edges with the projecting flanges 59. These flanges are received in properly positioned grooves 22 in the ledge 16 in the housing 8a, the grooves 22 in this instance being so located that when the separator is placed in the barrel of the housing 8a, the baffle plate 58 will be located in front of the passage 60 leading from the interior of the barrel to the outlet port 50. This arrangement of the baffle 58 causes the air to flow through the separator sleeves as shown by the arrows at the right in FIG. 7 rather than flowing around the outside of the sleeves and out of the port 50.

The outer sleeve 53 is provided at the top with a radially-projecting annular flange 61 which seats upon the ledge 16 in the housing 8a and the sleeve 53 has diametrically-opposite hook-shaped upstanding lugs 62 arranged to engage over the top of a flange 63 provided on the inner sleeve 54. The flange 63 is notched as shown at 64 for engagement under the lugs 62 to thus hold the two concentric sleeves in their proper relationship.

The bottom wall 65 of the inner sleeve 54 is imperforate except for a central drain opening 66 which registers with a similar opening 67 (FIG. 7) provided in the bottom wall of the outer sleeve 53. The bottom walls of the two sleeves may, if desired, slope downwardly toward the drain openings 66, 67. The bottom wall of the outer sleeve may present a foraminous area 68 (FIG. 4) around the edge of the bottom wall 65 of the inner sleeve. The inner sleeve 54 is open at the top and extending across said open top is a loop-shaped strap 69 serving as a handle for the insertion and removal of the separator basket through the top opening of the housing 8a by the removal of the cover 13. The loop member 69 also receives the contact of the cover plate to hold it and the attached separator basket down and properly seated.

When two or more of the separator units are employed in series as shown in FIG. 7, the air flow therethrough takes place substantially as shown by the arrows. After passing through the first of the separators, or that shown at 5, the air will flow through the nipple 52 to enter the housing 8a and then flow as indicated by the arrows, with the oil draining down and out through the outlet 31 and through tube or pipe 32 and back to the lantern gland of the stuffing box 39 or to the oil sump.

The arrangements which have been described are such that effective separation of the oil from the air is attained, the recovered oil returning to the sump or to the air inlet for its circulation and without material loss of the oil.

Having thus described an embodiment of the invention, it is obvious that the same is not to be restricted thereto, but is broad enough to cover all structures coming within the scope of the annexed claims.

Such modifications of the basic inventive concept as would be obvious to one having reasonable skill in the art may be made without departing from the scope and spirit thereof. For example, while it is preferable to have the perforations smaller in the sleeve first contacted by the air stream, this is not essential and the perforations in the first screen may be of the same size or larger.

Also, any suitable type of closure for the housing may be used in place of the one disclosed, such as a cover plate secured by studs and nuts. While the drain outlet has been described as having frusto-conical walls leading to it, a plain opening is also satisfactory.

Additionally, any type of packing gland or stuffing box can be used, the lantern gland referred to having been found very satisfactory. It may also be desired to have the return line go directly to the pump inlet.

For best results, the constriction orifice should be of such size that oil is returned as fast as it is collected and at the same time, not being so large that the capacity of the pump is impractically reduced.

Still further, a heat exchanger or after cooler may be placed at any desired point in the line without adversely affecting the operation of the oil separating system. Another modification of this invention would be to substitute wire or other mesh for the perforated sleeves described.

What is claimed is:

1. Oil separating means for air pumps, comprising an oil separator having a substantially cylindrical upright body, an inlet for said air at the upper part of said body, outer and inner spaced foraminous sleeves in concentric relation depending from the top of said body into said cylindrical body, the outer sleeve having openings of smaller diameter than the openings in said inner sleeve, said inlet communicating with said body causing said air to flow through said outer and inner sleeves successively, a baffle interposed between said inlet and said outer sleeve deflecting the flow of said air around and through said sleeves, a perforated bottom wall between said sleeves at the lower end thereof, the lower end of said inner sleeve being open, said sleeves terminating above the bottom of the body to permit drippings of liquid from said baffle and sleeves to fall freely, a horizontal inwardly extending ledge formed on said body and positioned adjacent to the top of said body, means connecting said sleeves at the tops thereof, said connecting means extending radially outward and resting on said ledge for supporting the tops of said sleeves, an exit space above said ledge, and means in said exit space for holding said sleeves from upward movement, an air outlet at the top of said body, a perforated wall at the top of said inner sleeve causing said air to pass through said wall and into said exit space, the lower ends of said sleeves hanging freely and an opening at the bottom of said body to allow removal of trapped oil.

2. Oil separating means according to claim 1 in which said inlet is an imperforate vertical standpipe, a relatively short tube coaxially positioned in said standpipe spaced from the wall thereof, an annular imperforate baffle interposed between said standpipe and said tube, the tube depending from said baffle, whereby air flowing upwardly and impinging on said tube and baffle causes separation of entrained liquid which flows downwardly on the wall of said standpipe.

3. Oil separating means according to claim 1 in which there is provided a second oil separator in lateral alignment with said first separator, said second separator having a substantially cylindrical body, a second inlet for said air at the upper part of said body, outer and inner spaced foraminous sleeves in said separator being in concentric relation depending from adjacent the top of said body into said cylindrical body, the inner sleeve having openings of smaller diameter than the openings in said outer sleeve, said second inlet connected to the air outlet, means for causing said air flow through said inner and outer sleeves successively, the bottom wall of said second inner sleeve being imperforate but for a drain opening therein, the bottom wall of said second outer sleeve having a foraminous portion between said sleeves, an air outlet at the top of said second separator body opposite said second inlet, a baffle interposed between said second exit and said second outer sleeve, the lower ends of said second sleeves hanging freely and an opening at the bottom of said second body to allow removal of trapped oil.

4. Oil separating means according to claim 1 wherein there is at least one vertical slot in said ledge, the baffle having lateral edges, at least one of the lateral edges of said baffle having at least one vertical flange, said flange in said slot.

References Cited

UNITED STATES PATENTS

| | | | |
|---|---|---|---|
| 1,033,544 | 7/1912 | Collin | 55—312 |
| 1,063,047 | 5/1913 | Lohrmann | 55—517 |
| 3,011,644 | 12/1961 | Farrell et al. | 55—517 |
| 3,179,253 | 4/1965 | McNeal | 210—315 |
| 3,257,957 | 6/1966 | Tracy | 103—111 |
| 1,100,435 | 6/1914 | Lance | 210—512 |
| 2,095,586 | 10/1937 | Algard | 55—330 |
| 2,157,829 | 5/1939 | Metzgar | 55—465 |
| 386,173 | 7/1888 | White | 55—464 |
| 784,537 | 3/1905 | Bearss | 55—436 |
| 864,158 | 8/1907 | De Lany | 55—465 |
| 1,288,729 | 12/1918 | Stamey. | |
| 1,531,096 | 3/1925 | Hoffman | 55—516 |
| 2,402,140 | 6/1946 | Heintzelman | 55—482 |
| 2,888,094 | 5/1959 | Ipsen et al. | 55—498 |
| 3,093,469 | 6/1963 | Woolston et al. | 55—441 |
| 3,172,745 | 3/1965 | Noedham et al. | 55—389 |
| 3,186,513 | 6/1965 | Dunn et al. | 103—111 |
| 3,209,917 | 10/1965 | Yelink | 55—510 |

FOREIGN PATENTS

| | | |
|---|---|---|
| 202,861 | 8/1923 | Great Britain. |
| 468,487 | 10/1950 | Canada. |

HARRY B. THORNTON, *Primary Examiner.*

B. NOZICK, *Assistant Examiner.*

U.S. Cl. X.R.

55—357, 441, 473, 517, 527; 210—315; 230—207